United States Patent
Iguchi et al.

(10) Patent No.: US 12,283,430 B2
(45) Date of Patent: Apr. 22, 2025

(54) CERAMIC ELECTRONIC DEVICE HAVING A COPPER-CONTAINING BAKED ELECTRODE LAYER

(71) Applicant: TDK CORPORATION, Tokyo (JP)

(72) Inventors: Toshihiro Iguchi, Tokyo (JP); Tetsuhiro Takahashi, Tokyo (JP); Tomohisa Fukuoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 358 days.

(21) Appl. No.: 17/894,293

(22) Filed: Aug. 24, 2022

(65) Prior Publication Data

US 2023/0107429 A1    Apr. 6, 2023

(30) Foreign Application Priority Data

Oct. 5, 2021 (JP) .................... 2021-164078

(51) Int. Cl.
H01G 4/232 (2006.01)
H01G 4/30 (2006.01)

(52) U.S. Cl.
CPC ............. *H01G 4/2325* (2013.01); *H01G 4/30* (2013.01)

(58) Field of Classification Search
CPC ............................... H01G 4/30; H01G 4/2325
See application file for complete search history.

(56) References Cited

U.S. PATENT DOCUMENTS

| | | | |
|---|---|---|---|
| 2011/0141658 A1* | 6/2011 | Na | H01G 4/30 361/321.2 |
| 2016/0039711 A1* | 2/2016 | Miyazaki | H01B 1/20 252/519.51 |
| 2018/0090276 A1* | 3/2018 | Ito | H01G 4/248 |
| 2018/0286583 A1* | 10/2018 | Onoue | H01G 4/012 |
| 2021/0104364 A1* | 4/2021 | Okuda | H01G 4/1218 |

FOREIGN PATENT DOCUMENTS

| | | | |
|---|---|---|---|
| CN | 115223792 A | * | 10/2022 |
| JP | H04-171912 A | | 6/1992 |
| JP | 2003-318059 A | | 11/2003 |
| JP | 2012-182355 A | | 9/2012 |

* cited by examiner

*Primary Examiner* — David M Sinclair
(74) *Attorney, Agent, or Firm* — Oliff PLC

(57) ABSTRACT

A ceramic electronic device includes an element body including a ceramic layer and an internal electrode layer, and an external electrode formed on an end surface of the element body and electrically connected to at least one end of the internal electrode layer. The external electrode includes a baked electrode layer. The baked electrode layer includes a main component comprising copper and/or a copper alloy. The baked electrode layer includes a void. An inner wall surface defining the void is at least partly covered by a film comprising nickel and/or a nickel alloy.

10 Claims, 5 Drawing Sheets

CERAMIC ELECTRONIC DEVICE HAVING A COPPER-CONTAINING BAKED ELECTRODE LAYER

TECHNICAL FIELD

The present invention relates to a ceramic electronic device including an external electrode.

BACKGROUND

As shown in Patent Document 1, a ceramic electronic device including an element body containing a ceramic component and external electrodes formed on outer surfaces of the element body is known. Baked electrode layers are widely used as the external electrodes of the ceramic electronic device and can be formed by applying a conductive paste including a conductor powder and glass frit to the surfaces of the element body and baking the paste.

Unfortunately, when an electronic device including such baked electrode layers is used at a high temperature or under certain conditions, the external electrodes may be oxidized to increase the equivalent series resistance (ESR) of the electronic device. Additionally, the conventional ceramic electronic device has a low mounting strength on a substrate or the like.

Patent Document 1: JPH04171912 (A)

SUMMARY

The present invention has been achieved under such circumstances. It is an object of the invention to provide a ceramic electronic device that has a high mounting strength on a substrate or the like and can maintain a low ESR.

To achieve the above object, a ceramic electronic device according to the present invention includes an element body including a ceramic layer and an internal electrode layer; and an external electrode formed on an end surface of the element body and electrically connected to at least one end of the internal electrode layer, wherein the external electrode includes a baked electrode layer, the baked electrode layer includes a main component comprising copper and/or a copper alloy, the baked electrode layer includes a void, and an inner wall surface defining the void is at least partly covered by a film comprising nickel and/or a nickel alloy.

The present inventors have found that the ceramic electronic device having the above-mentioned structure has a high mounting strength on a substrate or the like and can maintain a low ESR. The reason why the above-mentioned effects are produced is not necessarily clear but may be as follows.

Since the baked electrode layer of the ceramic electronic device according to the present invention includes the void, it is possible to reduce stress applied by the baked electrode layer to the element body in a tightening direction during cooling or the like, after formation of the baked electrode layer on the element body. It is believed that, as a result, it is possible to improve the mounting strength on a substrate or the like and to prevent degradation of properties of and damage to the ceramic electronic device caused by, for example, deflection of the substrate on which the ceramic electronic device is mounted.

Additionally, since the baked electrode layer of the ceramic electronic device according to the present invention includes copper and/or a copper alloy as the main component, the baked electrode layer has high electrical conductivity. Also, the inner wall surface of the void of the baked electrode layer according to the present invention is at least partly covered by the film including nickel and/or a nickel alloy. Nickel and the nickel alloy form a passivation film. Consequently, copper or the like covered by the film, which includes nickel or the like containing the passivation film, is difficult to be oxidized. This further improves the electrical conductivity of the baked electrode layer. As a result, the ceramic electronic device can maintain a low ESR.

Preferably, the baked electrode layer includes a first region and a second region, the first region is in contact with the end surface of the element body and is located near a joint boundary between the baked electrode layer and the element body, the second region is located at an outer side of the first region and constitutes an external surface of the baked electrode layer, and a value of [(a second ratio of Ni/Cu)−(a first ratio of Ni/Cu)] is 0.02 or more based on the premise that the first ratio of Ni/Cu denotes an atomic ratio of nickel atoms to copper atoms in the first region and the second ratio of Ni/Cu denotes an atomic ratio of nickel atoms to copper atoms in the second region.

Because the second region is at the outer side farther from the element body, copper or the like is readily oxidized in the second region. Consequently, a high ratio of nickel in the second region (the region at the outer side) can further enhance the effects of preventing, for example, increase of the ESR due to change over time or a temperature change.

A conductor area ratio denotes a ratio of a total cross-sectional area of a conductor in a unit cross-sectional area of the baked electrode layer to the unit cross-sectional area of the baked electrode layer, and the conductor area ratio is preferably 0.55 to 0.75.

When the conductor area ratio is within the above-mentioned range, the ceramic electronic device has a stronger mounting strength on a substrate or the like and can maintain a lower ESR.

A void area ratio denotes a ratio of a total cross-sectional area of the void in a unit cross-sectional area of the baked electrode layer to the unit cross-sectional area of the baked electrode layer, and the void area ratio is preferably 0.1 to 0.25.

When the void area ratio is within the above-mentioned range, the ceramic electronic device has a stronger mounting strength on a substrate or the like and can maintain a lower ESR.

A whole ratio of Ni/Cu denotes an atomic ratio of nickel atoms to copper atoms in the baked electrode layer as a whole, and the whole ratio of Ni/Cu is preferably 0.08 to 0.2.

When the whole ratio of Ni/Cu is within the above-mentioned range, the film including nickel is more readily formed on the inner wall surface of the void, changes in the ESR due to a temperature change can be reduced, and the ceramic electronic device has a stronger mounting strength on a substrate or the like.

The baked electrode layer may include an oxide including silicon and/or zinc.

BRIEF DESCRIPTION OF THE DRAWING(S)

DETAILED DESCRIPTION

Figure 1:
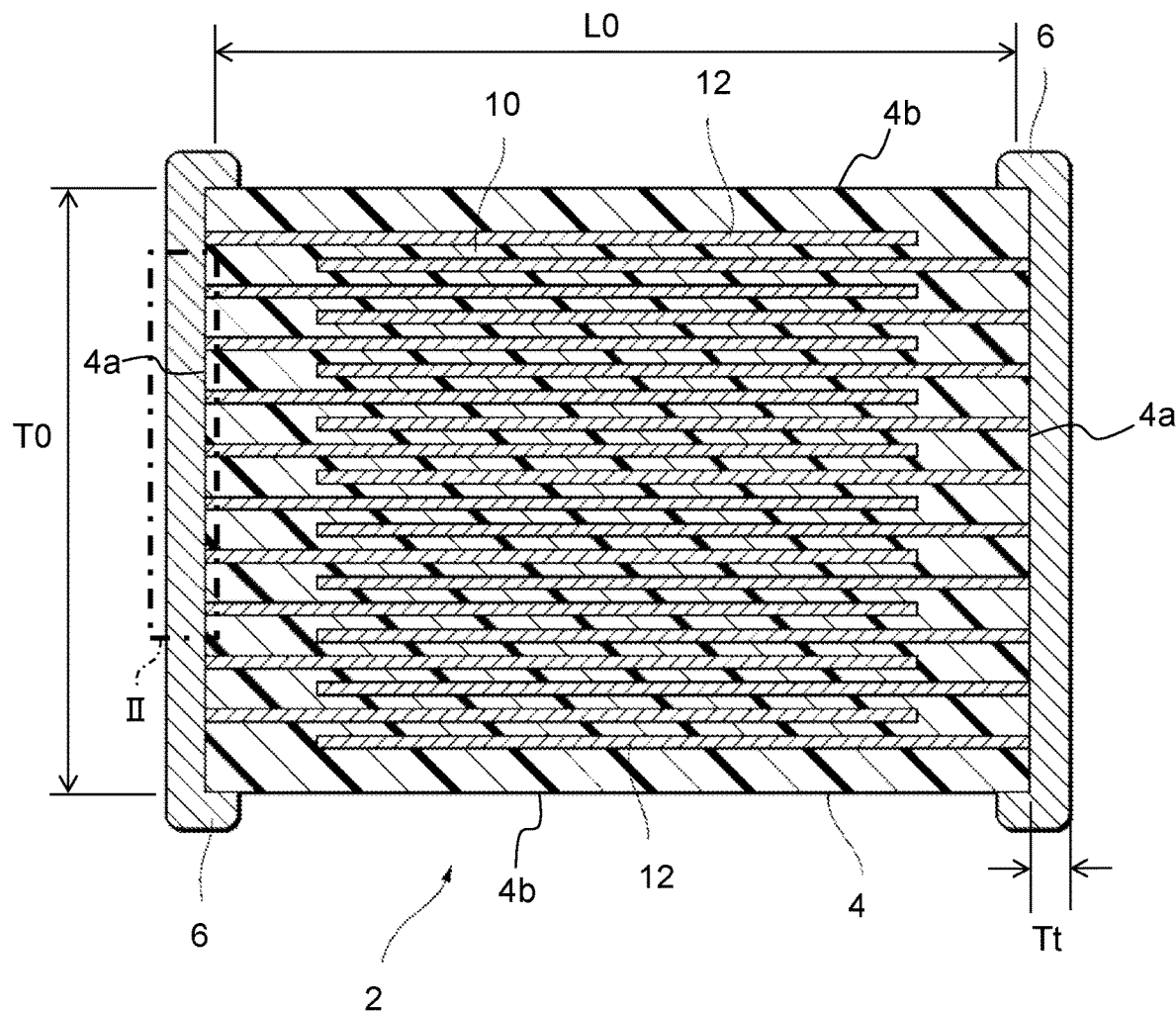
FIG. 1 is a schematic cross-sectional view of a multilayer ceramic capacitor according to an embodiment of the present invention.

The present invention will be described below in detail based on an embodiment illustrated in the drawings.

In the present embodiment, a multilayer ceramic capacitor 2 shown in FIG. 1 is described as a ceramic electronic device according to the present invention. The multilayer ceramic capacitor 2 includes an element body 4 and a pair of external electrodes 6 formed on outer surfaces of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction. The element body 4 may have any other shapes, such as an elliptic cylinder shape, a cylindrical shape, and a prismatic shape. The element body 4 may have any external dimensions. For example, the element body 4 may have a length (L0) of 0.4 to 5.7 mm in the X-axis direction, a width (W0) of 0.2 to 5.0 mm in the Y-axis direction, and a height (T0) of 0.2 to 3.0 mm in the Z-axis direction.

In the present embodiment, the X-axis, the Y-axis, and the Z-axis are perpendicular to each other. In the present embodiment, an "inner side" means the side closer to a center of the multilayer ceramic capacitor 2, and an "outer side" means the side farther from the center of the multilayer ceramic capacitor 2.

The element body 4 includes dielectric layers 10 (ceramic layers) and internal electrode layers 12 substantially parallel to the plane containing the X-axis and the Y-axis. Inside the element body 4, the dielectric layers 10 and the internal electrode layers 12 are laminated alternately along the Z-axis direction (lamination direction). "Substantially parallel" means that the dielectric layers 10 and the internal electrode layers 12 are mostly parallel to the plane but may partly be slightly nonparallel. The dielectric layers 10 and the internal electrode layers 12 may slightly be uneven or inclined.

According to FIG. 1, the end surfaces 4a of the element body 4 in the X-axis direction are flat. In other words, the dielectric layers 10 and the internal electrode layers 12 are laminated so as to be flush with each other. However, the end surfaces 4a of the element body 4 in the X-axis direction may be partly non-planar. Moreover, the dielectric layers 10 and the internal electrode layers 12 may not be flush with each other. For example, the dielectric layers 10 and the internal electrode layers 12 may be laminated so that the dielectric layers 10 are partly scraped off or the internal electrode layers 12 are partly protruding.

The dielectric layers 10 are made of any material. The dielectric layers 10 may include, for example, a perovskite compound represented by $ABO_3$ or a tungsten bronze compound as a main component. Preferably, the dielectric layers 10 include a perovskite compound represented by $ABO_3$ as the main component.

The main component of the dielectric layers 10 is a component included in the dielectric layers 10 at 80 mass % or more.

The perovskite compound represented by $ABO_3$ is represented by, for example, $(Ba_{1-a-b}Sr_aCa_b)_m(Ti_{1-c-d}Zr_cHf_d)O_3$ and may satisfy $0.94<m<1.1$, $0 \le a \le 1$, $0 \le b \le 1$, $0 \le c \le 1$, and $0 \le d \le 1$.

"m" indicates the element ratio of the A-site to the B-site. For example, $0.94<m<1.1$ is satisfied.

"a" indicates the element ratio of strontium (Sr). For example, $0 \le a \le 1$ is satisfied. Preferably, $0 \le a < 1$ is satisfied.

"b" indicates the element ratio of calcium (Ca). $0 \le b \le 1$ is satisfied. Preferably, $0 \le b < 1$ is satisfied.

"c" indicates the element ratio of zirconium (Zr). $0 \le c \le 1$ is satisfied. Preferably, $0 \le c < 1$ is satisfied.

"d" indicates the element ratio of hafnium (Hf). $0 \le d \le 1$ is satisfied. Preferably, $0 \le d < 1$ is satisfied.

The element ratio of oxygen (O) in the above-mentioned composition formula may slightly deviate from the stoichiometric composition.

The dielectric layers 10 according to the present embodiment may include subcomponents, such as manganese compounds, magnesium compounds, chromium compounds, nickel compounds, rare-earth element compounds, silicon compounds, lithium compounds, boron compounds, and vanadium compounds, in addition to the main component. There is no limit to the type, combination, or addition amount of the subcomponents.

The average thickness (Td) of the dielectric layers 10 sandwiched between the internal electrode layers 12 is not limited. For example, the average thickness is preferably 30 μm or less, more preferably 15 μm or less, and still more preferably 10 μm or less. The number of the dielectric layers 10 is determined based on desired characteristics and is not limited. For example, the number of the dielectric layers 10 may be 20 or more, and preferably 50 or more.

The internal electrode layers 12 are laminated between the dielectric layers 10. The number of the internal electrode layers 12 is determined based on the number of the dielectric layers 10. The average thickness (Te) of the internal electrode layers 12 is not limited and may be, for example, 3.0 μm or less.

The internal electrode layers 12 are laminated so that one end of one internal electrode layer 12 and the other end of the next internal electrode layer 12 are alternately exposed to the two end surfaces 4a of the element body 4 facing each other in the X-axis direction. The pair of external electrodes 6 is formed on the end surfaces 4a of the element body 4 and is electrically connected to the exposed ends of the alternately arranged internal electrode layers 12. The internal electrode layers 12 and the external electrodes 6 formed in such a manner thus constitute a capacitor circuit.

That is, as part of the capacitor circuit, the internal electrode layers 12 apply voltage to each dielectric layer 10. Thus, the internal electrode layers 12 include a conductive material. Specifically, the internal electrode layers 12 may include, for example, copper, nickel, silver, palladium, gold, platinum, or an alloy including at least one of these metal elements. Preferably, the conductive material included in the internal electrode layers 12 is nickel or a nickel alloy, because the constituent material of the dielectric layers 10 has resistance to reducibility. When the main component of the internal electrode layers 12 is nickel or a nickel alloy, the internal electrode layers 12 may include one or more subcomponents selected from manganese, copper, chromium, or the like.

The internal electrode layers 12 may include, in addition to the above-mentioned conductive material, the ceramic component of the dielectric layers 10 as an inhibitor and a trace amount (e.g., about 0.1 mass % or less) of non-metal components, such as sulfur and phosphorus.

As shown in FIG. 1, each external electrode 6 of the present embodiment integrally includes an end surface part formed on the corresponding end surface 4a of the element body 4 in the X-axis direction, and extended parts each formed at one end (in the X-axis direction) of one of the four side surfaces 4b of the element body 4. That is, each of the pair of external electrodes 6 is formed so as to extend from the end surface 4a to the side surfaces 4b of the element body 4. The external electrodes 6 are insulated from each other so as not to be in contact with each other in the X-axis direction.

In the present embodiment, as explained above, the extended parts of the external electrodes 6 are formed on the four side surfaces 4b of the element body 4. However, the extended parts of the external electrodes 6 are not necessarily formed, and each external electrode 6 may include only the end surface part. Alternatively, when the multilayer ceramic capacitor 2 is to be surface-mounted on a substrate, the extended parts of the external electrodes 6 are formed at least on the side surface 4b facing a mounting surface of the substrate at the shortest distance and are not necessarily formed on the side surface 4b opposite the mounting surface.

Figure 2:
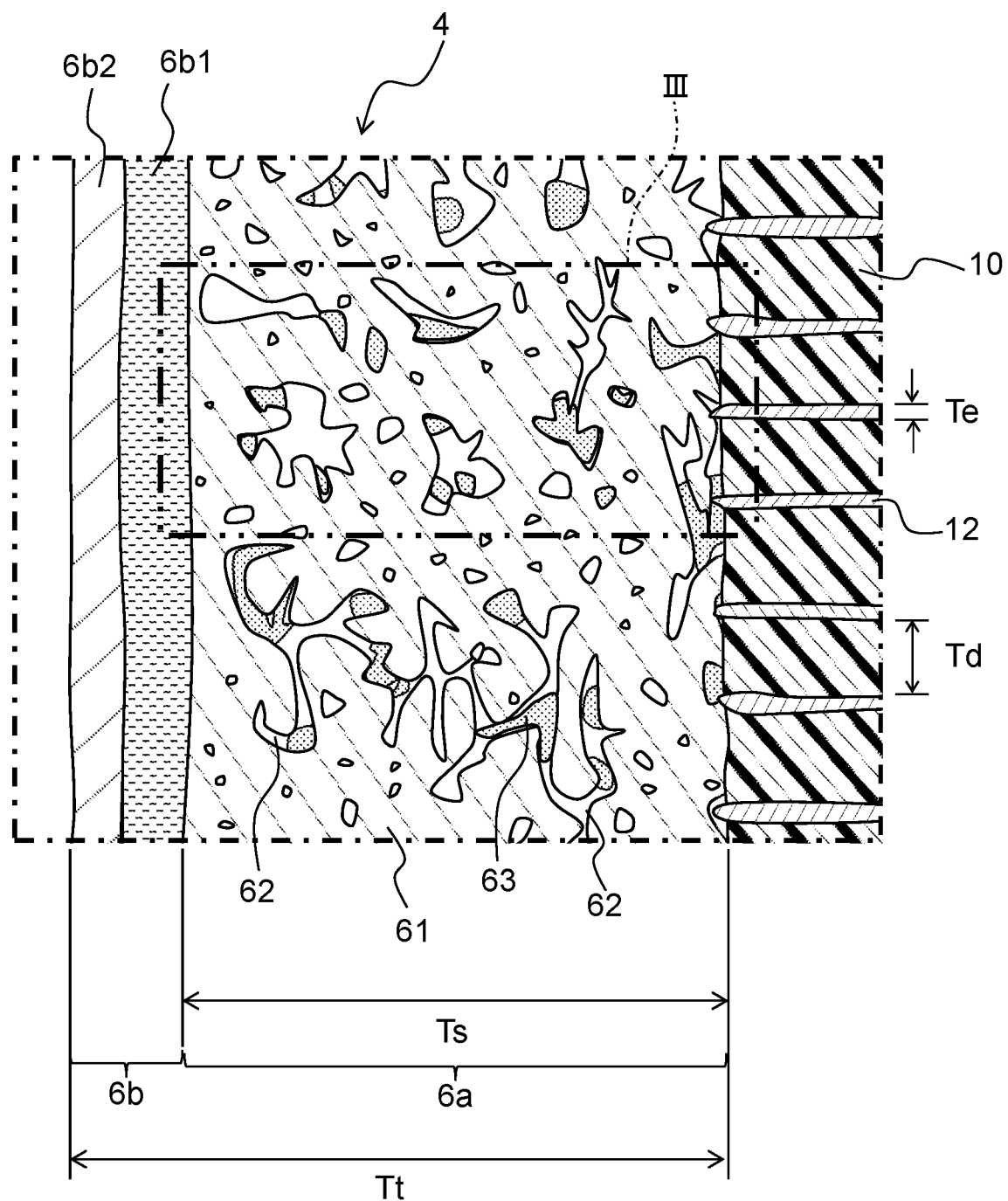
FIG. 2 is an enlarged cross-sectional view of the region II shown in FIG. 1.

FIG. 2 is an enlarged schematic cross-sectional view of the region II shown in FIG. 1. Although FIG. 2 illustrates only one of the pair of external electrodes 6, the other external electrode 6 has the same characteristics as the external electrode 6 shown in FIG. 2. Hereinafter, the detailed characteristics of the external electrodes 6 of the present embodiment will be explained based on FIG. 2.

Figure 3:
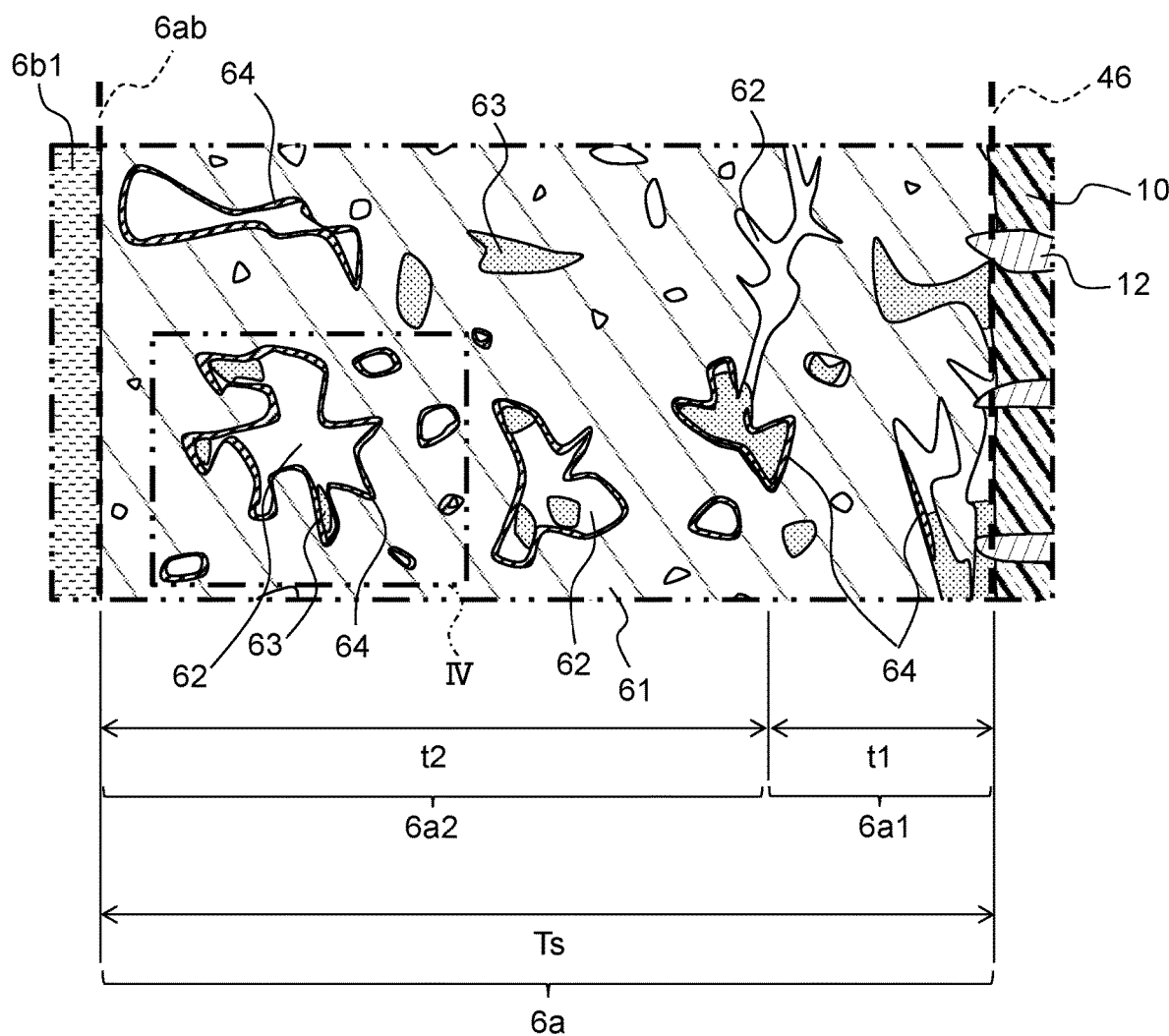
FIG. 3 is an enlarged cross-sectional view of the region III shown in FIG. 2.
Figure 4:
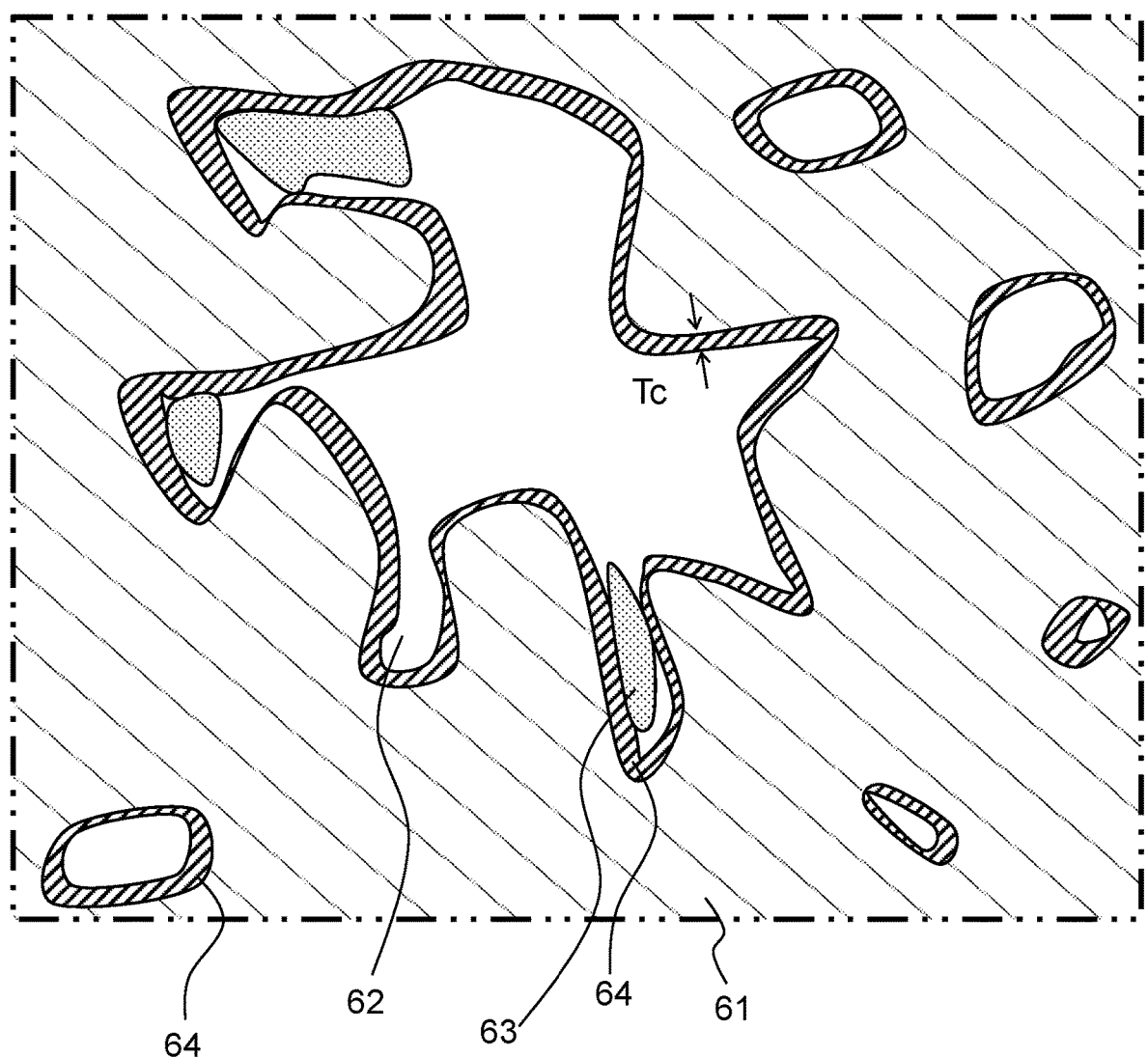
FIG. 4 is an enlarged cross-sectional view of the region IV shown in FIG. 3.

As shown in FIG. 2, the external electrode 6 includes a baked electrode layer 6a containing a conductor 61, voids 62, and oxides 63. In the baked electrode layer 6a, films 64 at least partly cover inner wall surfaces defining the voids 62. The films 64 include nickel and/or a nickel alloy. The films 64 are not shown in FIG. 2, but are shown in FIGS. 3 and 4 described later.

The baked electrode layer 6a includes copper and/or a copper alloy as a main component. That is, copper and/or a copper alloy constitutes the conductor 61. Note that the conductor 61 also includes the films 64. This means that calculation of the conductor area ratio (described later) is performed on the premise that the films 64 are included in the conductor 61. The main component of the baked electrode layer 6a is a component included in the baked electrode layer 6a at 80 mass % or more.

When the conductor 61 includes a copper alloy, the conductor 61 may include elements such as aluminium, nickel, silver, palladium, tin, zinc, phosphorus, iron, and manganese, in addition to copper. The constituent elements of the conductor 61 other than copper are preferably 5 parts by mol or less with respect to 100 parts by mol of copper.

The oxides 63 of the present embodiment may include any components. The oxides 63 include silicon and/or zinc. The oxides 63 may also include boron, aluminium, zirconium, manganese, magnesium, titanium, potassium, sodium, calcium, strontium, barium, phosphorus, and rare earth elements in addition to silicon and/or zinc. The oxides 63 may or may not be glass.

The baked electrode layer 6a is in contact with the corresponding outer surface (end surface 4a) of the element body 4.

The external electrode 6 may include only the baked electrode layer 6a or may include a plurality of laminated electrode layers. When the external electrode 6 includes a plurality of electrode layers, the baked electrode layer 6a is formed so as to be in contact with the outer surface of the element body 4, and other electrode layers (e.g., another baked electrode layer 6a, a resin electrode layer, and a plating electrode layer) are formed on the baked electrode layer 6a.

As shown in FIG. 2, the external electrode 6 preferably includes a plating electrode layer 6b. Forming the plating electrode layer 6b improves the solder wettability of the external electrode 6. FIG. 2 exemplifies the external electrode 6 having a triple-layer structure including the baked electrode layer 6a, a nickel plating electrode layer 6b1, and a tin plating electrode layer 6b2 (laminated in this order).

The average thickness (Ts) of the baked electrode layer 6a, which is in contact with the end surface 4a, may be 5 to 200 μm and is preferably 20 to 50 μm. When the external electrode 6 includes a plurality of electrode layers, the average thickness (Tt) of the external electrode 6 may be about 5 to 300 μm and is preferably 100 μm or less.

In the present embodiment, the conductor area ratio, which is the ratio of the total cross-sectional area of the conductor 61 in a unit cross-sectional area of the baked electrode layer 6a to the unit cross-sectional area of the baked electrode layer 6a, is not limited. The conductor area ratio is preferably 0.55 to 0.75 and is more preferably 0.56 to 0.74. The multilayer ceramic capacitor 2 is less likely to be damaged by deflection when the conductor area ratio is within the above-mentioned range than when the conductor area ratio exceeds the above-mentioned range. The multilayer ceramic capacitor 2 can also maintain a lower equivalent series resistance (ESR) when the conductor area ratio is within the above-mentioned range than when the conductor area ratio falls below the above-mentioned range.

Preferably, the "unit cross-sectional area" includes a region extending at least from the vicinity of a joint boundary 46 to the vicinity of an external surface 6ab.

In the present embodiment, the void area ratio, which is the ratio of the total cross-sectional area of the voids 62 in a unit cross-sectional area of the baked electrode layer 6a to the unit cross-sectional area of the baked electrode layer 6a, is not limited. The void area ratio is preferably 0.1 to 0.25 and is more preferably 0.12 to 0.24. The multilayer ceramic capacitor 2 can maintain a lower ESR when the void area ratio is within the above-mentioned range than when the void area ratio exceeds the above-mentioned range. The multilayer ceramic capacitor 2 is also less likely to be damaged by deflection when the void area ratio is within the above-mentioned range than when the void area ratio falls below the above-mentioned range.

In the present embodiment, the atomic ratio (whole ratio of Ni/Cu) of the number of nickel atoms to the number of copper atoms in the baked electrode layer 6a as a whole is preferably 0.08 to 0.2 and is more preferably 0.082 to 0.191. The multilayer ceramic capacitor 2 is less likely to be damaged by deflection when the whole ratio of Ni/Cu is within the above-mentioned range than when the whole ratio of Ni/Cu exceeds the above-mentioned range. The multilayer ceramic capacitor 2 can maintain a lower ESR when the whole ratio of Ni/Cu is within the above-mentioned range than when the whole ratio of Ni/Cu falls below the above-mentioned range. This is because, when the whole ratio of Ni/Cu is within the above-mentioned range, the films 64 are readily formed even if a heating treatment is performed at a high temperature.

FIG. 3 is an enlarged schematic cross-sectional view of the region III shown in FIG. 2. As shown in FIG. 3, in the present embodiment, the baked electrode layer 6a is divided into at least two regions and includes a first region 6a1 and a second region 6a2.

The first region 6a1 is in contact with the end surface 4a of the element body 4 and is located near the joint boundary 46, which is the boundary between the element body 4 and the baked electrode layer 6a. As shown in FIG. 3, the joint boundary 46 of the present embodiment is not a strict boundary between the element body 4 and the baked electrode layer 6a, and is illustrated as a straight line substantially located at the boundary between the element body 4 and the baked electrode layer 6a.

The second region 6a2 is located at the outer side of the first region 6a1 and constitutes the external surface 6ab of the baked electrode layer 6a. That is, the second region 6a2 is a region near the external surface 6ab in contact with the plating electrode layer 6b.

For example, the thickness (t1) of the first region 6a1 and the thickness (t2) of the second region 6a2 may be determined as follows.

An X-Z cross section of the external electrode 6 of the multilayer ceramic capacitor 2 is obtained. Then, a baked-electrode-layer-thickness line, which is a line equivalent to the thickness (Ts) of the baked electrode layer 6a, is drawn. The baked-electrode-layer-thickness line is parallel to the X-axis direction and extends from the end surface 4a of the element body 4 to the external surface 6ab. At ten or more equally spaced measurement points on the baked-electrode-layer-thickness line, the atomic ratio (Ni/Cu) of the number of nickel atoms to the number of copper atoms is calculated. The values of Ni/Cu of all pairs of adjacent two measurement points on the baked-electrode-layer-thickness line are compared. The pair having a larger value of Ni/Cu on the external surface 6ab side than on the element body 4 side, a difference of 0.02 or more, and a largest absolute value of the difference is identified. The middle point between those two measurement points is deemed to be the regional boundary point between the first region 6a1 and the second region 6a2. That is, a region extending from the regional boundary point to the end surface 4a of the element body 4 is the first region 6a1, and a region extending from the regional boundary point to the external surface 6ab is the second region 6a2. Also, the distance from the regional boundary point to the end surface 4a of the element body 4 is the thickness (t1) of the first region 6a1, and the distance from the regional boundary point to the external surface 6ab is the thickness (t2) of the second region 6a2.

The thickness (t1) of the first region 6a1 is preferably 15% to 35% of the thickness (Ts) of the baked electrode layer 6a and is more preferably 20% to 30% of the thickness (Ts) of the baked electrode layer 6a.

Note that, the first ratio of Ni/Cu (described later) may be an average of the values of Ni/Cu of the measurement points in the first region 6a1 among all measurement points on the baked-electrode-layer-thickness line. Also note that, the second ratio of Ni/Cu (described later) may be an average of the values of Ni/Cu of the measurement points in the second region 6a2 among all measurement points on the baked-electrode-layer-thickness line.

The conductor 61 of the first region 6a1 and the conductor 61 of the second region 6a2 may have different compositions, but preferably have the same composition.

FIG. 4 is an enlarged schematic cross-sectional view of the region IV shown in FIG. 3. As shown in FIGS. 3 and 4, in the present embodiment, the films 64 including nickel or a nickel alloy at least partly cover the inner wall surfaces defining the voids 62. That is, the films 64 may entirely or only partly cover the surfaces of the voids 62. However, the inside of the voids 62 is preferably not filled with the films 64 entirely. The films 64 may have an uneven thickness or irregularities.

As described above, the films 64 at least partly cover the inner wall surfaces of the voids 62. Consequently, in the present embodiment, among the voids 62 having an equivalent circular diameter of 3 μm or more in a field of view of 30 μm×30 μm in contact with the external surface 6ab, the number of the voids 62 completely filled with nickel and/or a nickel alloy is preferably one or less and is more preferably zero. Note that the equivalent circular diameter indicates a diameter of a circle having the same area as the area of the relevant shape.

The voids 62 may include the oxides 63 inside, and the films 64 may be formed between the conductor 61 and the oxides 63.

The films 64 may have any average thickness (Tc). The average thickness is 0.5 to 3 μm and is preferably 0.58 to 2.9 μm. The multilayer ceramic capacitor 2 is less likely to be damaged by deflection when the average thickness of the films 64 is within the above-mentioned range than when the average thickness of the films 64 exceeds the above-mentioned range. The multilayer ceramic capacitor 2 can maintain a lower ESR when the average thickness of the films 64 is within the above-mentioned range than when the average thickness of the films 64 falls below the above-mentioned range. This is because, when the average thickness of the films 64 is within the above-mentioned range, the effects produced by the films 64 are readily exhibited even if a heating treatment is performed at a high temperature.

In the present embodiment, four or more films 64 having a thickness of 0.5 μm or more and a length of 4 μm or more are preferably observed in a field of view of 30 μm×30 μm in contact with the external surface 6ab.

In the present embodiment, the value of [(the second ratio of Ni/Cu)−(the first ratio of Ni/Cu)] is preferably 0.02 or more and is more preferably 0.023 to 0.073, based on the premise that the first ratio of Ni/Cu denotes the atomic ratio of the number of nickel atoms to the number of copper atoms in the first region 6a1, and the second ratio of Ni/Cu denotes the atomic ratio of the number of nickel atoms to the number of copper atoms in the second region 6a2. The reason is that the need to form the films 64 is greater in the second region 6a2 than in the first region 6a1, because copper is readily oxidized in the second region 6a2 on the outer side. That is, a high ratio of nickel in the second region (the region on the outer side) can further enhance the effects of preventing, for example, increase of the ESR due to change over time, a temperature change, or the like.

The external electrode 6 can be analyzed by a cross-sectional observation using a scanning electron microscope (SEM), a scanning transmission electron microscope (STEM), or the like. The compositions of the conductor 61, the oxides 63, and the films 64 can be measured by performing a component analysis with an electron probe micro-analyzer (EPMA) in the cross-sectional observation. In the present embodiment, when the component analysis or the like is performed with the EPMA, an energy dispersive spectroscope (EDS) or a wavelength dispersive spectroscope (WDS) can be used as an X-ray spectroscope. Preferably, the component analysis is performed at least at three points, and the compositions of the conductor 61, the oxides 63, and the films 64 are calculated as averages of the measurement results.

For example, the conductor area ratio and the void area ratio of the baked electrode layer 6a can be measured by image analysis of a cross-sectional photograph given by the cross-sectional observation with SEM, STEM, or the like. When a cross section of the baked electrode layer 6a is observed with a backscattered electron image of SEM, a HAADF image of STEM, or the like, the conductor 61, which is often denser than other parts, can often be recognized as having a bright contrast. In contrast, the oxides 63 can often be recognized as having a dark contrast, and the voids 62 can often be recognized as having a darker contrast than the oxides 63. Consequently, binarizing the cross-sectional photograph often enables the conductor area ratio to be calculated as the ratio of the area having a bright contrast to the entire area of the field of view subject to measurement. Likewise, the void area ratio can often be calculated as the ratio of the area having a darker contrast to the entire area of the field of view subject to measurement.

Specifically, the average conductor area ratio is calculated as follows. The unit cross-sectional area (L) denotes an area extending at least from the vicinity of the joint boundary 46 to the vicinity of the external surface 6ab in the X-Z cross section. The total area (M) of the conductor 61 in each of five unit cross-sectional areas is calculated. Then, the average of M/L is worked out.

The average void area ratio is calculated as follows. The unit cross-sectional area (L) denotes an area extending at least from the vicinity of the joint boundary 46 to the vicinity of the external surface 6ab in the X-Z cross section. The total area (N) of the voids 62 in each of five unit cross-sectional areas is calculated. Then, the average of N/L is worked out.

A method of manufacturing the multilayer ceramic capacitor 2 shown in FIG. 1 will be explained next.

First, a manufacturing process of the element body 4 will be explained. In the manufacturing process of the element body 4, a dielectric-layer paste to be the dielectric layers 10 after firing and an internal-electrode-layer paste to be the internal electrode layers 12 after firing are prepared.

The dielectric-layer paste is prepared using, for example, the following method. First, dielectric raw materials are uniformly mixed by means such as wet mixing and dried. Then, the mixture is heated under predetermined conditions to give a calcined powder. Next, a known organic vehicle or a known water based vehicle is added to the calcined powder, and the mixture is kneaded to give the dielectric-layer paste. The dielectric-layer paste is turned into sheets using, for example, a doctor blade method, to give ceramic green sheets. If necessary, the dielectric-layer paste may include an additive selected from various dispersants, plasticizers, dielectrics, subcomponent compounds, glass frit, and the like.

The internal-electrode-layer paste is prepared by kneading a conductive powder made of a conductive metal or an alloy thereof with a known binder or solvent. If necessary, the internal-electrode-layer paste may include a ceramic powder (e.g., a barium titanate powder and a calcium and strontium zirconate powder) as an inhibitor. The inhibitor prevents sintering of the conductive powder in a firing step.

Next, the internal-electrode-layer paste is applied onto the ceramic green sheets in a predetermined pattern using a printing method (e.g., screen printing) or a transfer method. The green sheets with the internal electrode patterns are laminated and then pressed in the lamination direction to give a mother laminated body. At this time, the ceramic green sheets and the internal electrode patterns are laminated so that the ceramic green sheets are located on the upper and lower surfaces of the mother laminated body in the lamination direction.

The mother laminated body given by the above-mentioned process is cut into a predetermined size by dicing or push-cutting to give green chips. If necessary, the green chips may be subjected to solidification drying so that the plasticizer and the like are removed, and may then be subjected to barrel polishing using a horizontal centrifugal barrel machine or the like. In barrel polishing, the green chips are put into a barrel together with media and a polishing liquid, and a rotational movement or vibration is applied to the barrel. By barrel polishing, unwanted parts (e.g., burrs generated during cutting) are removed, and the corners of the green chips are rounded. The green chips after barrel polishing are washed with a cleaning solution (e.g., water) and dried.

Next, each green chip is subjected to a binder removal treatment and a firing treatment to give the element body 4.

The conditions of the binder removal treatment are appropriately determined based on the main component composition of the dielectric layers 10 and the main component composition of the internal electrode layers 12 and are not limited. For example, the heating rate is preferably 5 to 300° C./hour, the holding temperature is preferably 180 to 400° C., and the temperature holding time is preferably 0.5 to 24 hours. The binder removal atmosphere is air or a reducing atmosphere.

The conditions of the firing treatment are appropriately determined based on the main component composition of the dielectric layers 10 and the main component composition of the internal electrode layers 12 and are not limited. For example, the holding temperature during firing is preferably 1200 to 1400° C. and is more preferably 1220 to 1300° C., and the temperature holding time during firing is preferably 0.5 to 8 hours and is more preferably 1 to 3 hours. The heating rate and the cooling rate (temperature drop rate) are preferably 50 to 500° C./hour. Preferably, the firing atmosphere is a reducing atmosphere. As for the ambient gas, for example, a humidified mixed gas of nitrogen and hydrogen may be used. When the internal electrode layers 12 include a base metal (e.g., nickel and a nickel alloy), the oxygen partial pressure in the firing atmosphere is preferably $1.0 \times 10^{-14}$ to $1.0 \times 10^{-10}$ MPa.

After the firing treatment, annealing may be performed as necessary. Annealing is a treatment for reoxidizing the dielectric layers 10. If the firing treatment has been performed in the reducing atmosphere, annealing is preferably performed. The conditions of the annealing treatment are appropriately determined based on, for example, the main component composition of the dielectric layers 10, and are not limited. For example, the holding temperature is preferably 950 to 1150° C., the temperature holding time is preferably 0 to 20 hours, and the heating rate and the cooling rate are preferably 50 to 500° C./hour. A humidified nitrogen gas or the like is preferably used as the ambient gas, and the oxygen partial pressure in the annealing atmosphere is preferably $1.0 \times 10^{-9}$ to $1.0 \times 10^{-5}$ MPa.

In the binder removal treatment, the firing treatment, and the annealing treatment, a wetter or the like is used to humidify the nitrogen gas, the mixed gas, or the like. In this case, the water temperature is preferably about 5 to 75° C. The binder removal treatment, the firing treatment, and the annealing treatment may be performed consecutively or independently.

Next, the first region 6a1 of the baked electrode layer 6a is formed on the outer surfaces of the element body 4. To form the first region 6a1, a first region paste is prepared. The first region paste includes a metal powder (e.g., copper) to be the conductor 61 after a baking treatment and an oxide powder (e.g., a silicon oxide powder and a zinc oxide powder) to be the oxides 63 after the baking treatment. The first region paste may additionally include subcomponent raw materials (e.g., a binder, a solvent, a dispersant, and a plasticizer) as appropriate.

Silicon oxide and zinc oxide to be the oxides 63 may be included as a glass powder in the conductive paste. For example, the glass powder may be manufactured as follows. Raw materials of the glass powder, such as a zinc oxide powder, a silicon oxide powder, a boron oxide powder, a barium carbonate powder, and other oxide powders, are mixed at a predetermined ratio. The mixture is put into a crucible, and then the crucible is heated in a furnace to melt the mixture. The crucible containing the molten material is taken out from the furnace with tongs and is tilted to let the molten material drop into water. The material rapidly cools to give glass. Then, the glass is crushed in a mortar and further pulverized with a ball mill or the like to manufacture the glass powder having a predetermined grain size.

Next, the first region paste is applied onto the end surfaces 4a entirely and the ends of the side surfaces 4b (the ends near the end surfaces 4a) of the element body 4 by a dipping method or a printing method and is dried. Then, the element body 4 is held at 700 to 1000° C. for 0.1 to 3 hours to bake the first region paste. This can form the first region 6a1 of the baked electrode layer 6a.

The thickness (t1) of the first region 6a1 may be controlled by any method. For example, the thickness may be controlled by adjusting the application amount of the first region paste or the concentration of the metal powder in the first region paste.

The element bodies 4 including the first region 6a1, chips, media, and a polishing liquid are mixed by barrel polishing. The element bodies 4 after barrel polishing are washed with a cleaning solution (e.g., water) and dried. This can seal the voids 62 on the outer surface of the first region 6a1, because the surface of the first region 6a1 is hit to elongate the metal (e.g., copper).

Next, the second region 6a2 is formed on the outer surface of the first region 6a1. To form the second region 6a2, a second region paste is prepared. Except that the second region paste includes a resin powder, the second region paste is composed of the same components as the first region paste.

In the present embodiment, inclusion of the resin powder in the second region paste makes it easy to form the second region 6a2 having the voids 62 after the second region paste is baked. Thus, the resin powder included in the second region paste is a component that is thermally decomposed during baking and does not easily dissolve in the solvent included in the second region paste. From such a perspective, the resin powder included in the second region paste is preferably a crystalline resin, such as polypropylene and polyethylene. The solvent included in the second region paste is preferably alcohol, aromatic hydrocarbons, or the like. The resin powder included in the second region paste is thermally decomposed during baking and vaporizes as carbon dioxide. This forms the voids 62 in the second region 6a2.

The binder included in the second region paste is a component different from the resin powder and is added to give viscosity to the second region paste. Thus, the binder included in the second region paste is preferably soluble in the solvent included in the second region paste. The binder included in the second region paste is preferably ethyl cellulose, acrylic, or the like.

The second region paste is applied onto the outer surface of the first region 6a1 by a dipping method or a printing method and is dried.

The thickness (t2) of the second region 6a2 may be controlled by any method. For example, the thickness may be controlled by adjusting the application amount of the second region paste or the concentration of the metal powder in the second region paste. In the present embodiment, the application amount of the second region paste is preferably larger than the application amount of the first region paste. Alternatively, the concentration of the metal powder in the second region paste is preferably higher than the concentration of the metal powder in the first region paste.

Then, each element body 4 having the second region paste applied and dried is held at 700 to 1000° C. for 0.1 to 3 hours to bake the second region paste. This makes it easy to form the second region 6a2 having the voids 62.

After the second region 6a2 is formed, the baked electrode layer 6a is subjected to a short-time nickel plating treatment. Immediately after that, the element body 4 is washed with water to wash away excess plating solution. This forms the films 64 on the inner wall surfaces of the voids 62 of the baked electrode layer 6a.

The short-time nickel plating treatment may be performed by any method, such as electrolytic plating and electroless plating.

Reducing the time for performing the short-time nickel plating treatment or lowering the concentration of the plating solution tends to make the thickness of the films 64 thinner.

The short-time nickel plating treatment mostly contributes to formation of the films 64 on the inner wall surfaces of the voids 62 formed in the second region 6a2. However, the films 64 may also be formed on the inner wall surfaces of the voids 62 formed in the first region 6a1. The reason is considered to be as follows. Although the first region paste does not include a resin powder, some voids 62 may be formed in the first region 6a1. Some voids 62 on the outer surface of the first region 6a1 are not sealed even after barrel polishing. Thus, it is believed that the plating solution enters the voids 62 of the first region 6a1 via the voids 62 of the second region 6a2. Consequently, it is believed that the films 64 are also formed on the inner wall surfaces of the voids 62 of the first region 6a1.

After the films 64 are formed, the element bodies 4 having the baked electrode layer 6a including the first region 6a1 and the second region 6a2, chips, media, and a polishing liquid are mixed by barrel polishing. The element bodies 4 after barrel polishing are washed with a cleaning solution (e.g., water) and dried. This can seal the voids 62 on the external surface 6ab of the baked electrode layer 6a, because the surface of the baked electrode layer 6a is hit to elongate the metal (e.g., copper).

Further, a coating layer made of a plating or the like is formed on the outer side of the baked baked-electrode-layer pastes (the first region paste and the second region paste) as necessary. That is, the external electrodes 6 are formed by baking the baked-external-electrode-layer pastes and forming the coating layer made of a plating or the like. The coating layer is not limited. For example, a nickel plating electrode layer 6b1 may be formed, and then a tin plating electrode layer 6b2, a tin-lead plating electrode layer, or a gold plating electrode layer may be formed.

The above-mentioned process gives the multilayer ceramic capacitor 2 including the external electrodes 6.

The given multilayer ceramic capacitor 2 can be surface-mounted on a substrate (e.g., a printed wiring board) using solder (including molten solder, solder cream, and a solder paste) or a conductive adhesive and can be used in various electronics. Alternatively, the multilayer ceramic capacitor 2 can be mounted on a substrate via a wire-shaped lead terminal or a plate-shaped metal terminal.

The multilayer ceramic capacitor 2 according to the present embodiment includes the baked electrode layer 6a. The baked electrode layer 6a includes copper and/or a copper alloy as the main component. The baked electrode layer 6a also includes the voids 62. Further, the films 64 including nickel and/or a nickel alloy at least partly cover the inner wall surfaces defining the voids 62.

The present inventors have found that the multilayer ceramic capacitor 2 having the above-mentioned structure has a high mounting strength on a substrate or the like and can maintain a low ESR.

The reason why the above-mentioned effects are produced is not necessarily clear but may be as follows.

Since the baked electrode layer 6a according to the present embodiment includes the voids 62, it is possible to reduce stress applied by the baked electrode layer 6a to the element body 4 in a tightening direction during cooling or the like, after formation of the baked electrode layer 6a. As a result, it is possible to prevent damage to the multilayer ceramic capacitor 2 caused by, for example, deflection of a substrate on which the multilayer ceramic capacitor 2 is mounted. That is, the multilayer ceramic capacitor 2 according to the present embodiment has a strong mounting strength on the substrate or the like.

Also, since the baked electrode layer 6a according to the present embodiment includes copper and/or a copper alloy as the main component, the baked electrode layer 6a has high electrical conductivity. However, bare copper or a bare copper alloy may be oxidized, even on the inside. In this regard, the inner wall surfaces of the voids 62 of the baked electrode layer 6a according to the present embodiment are at least partly covered by the films 64 including nickel and/or a nickel alloy. Nickel and the nickel alloy form a passivation film. Consequently, copper or the like covered by the films 64, which include nickel or the like containing the passivation film, is difficult to be oxidized. This further improves the electrical conductivity of the baked electrode layer 6a. As a result, the multilayer ceramic capacitor 2 according to the present embodiment can maintain a low ESR.

If the main component of the baked electrode layer 6a is changed to nickel so that the external electrodes 6 are not easily oxidized, the ESR increases due to the passivation film of nickel. In this regard, because the main component of the baked electrode layer 6a of the present embodiment is copper and/or a copper alloy as described above, a lower ESR can be maintained in the present embodiment compared to when the main component of the baked electrode layer 6a is nickel.

Additionally, the multilayer ceramic capacitor 2 is less likely to crack due to, for example, deflection of a substrate on which the capacitor 2 is mounted, when the main component of the baked electrode layer 6a is copper and/or a copper alloy as in the present embodiment than when the main component of the baked electrode layer 6a is nickel.

Further, because the main component of the baked electrode layer 6a according to the present embodiment is copper and/or a copper alloy, migration, which is readily generated when the main component of the baked electrode layer 6a is silver, is not readily generated. This can prevent reduction of reliability.

Moreover, because the external electrodes include the baked electrode layer 6a containing the predetermined films 64 in the present embodiment, the external electrodes can maintain a lower ESR and more readily ensure quality at a high temperature, compared to resin electrodes.

Hereinbefore, an embodiment of the present invention has been explained. However, the present invention is not limited to the above-mentioned embodiment and can be modified variously without departing from the gist of the present invention.

In the present embodiment, the multilayer ceramic capacitor 2 exemplifies ceramic electronic devices. However, the ceramic electronic device of the present invention may be, for example, a bandpass filter, a multilayer three-terminal filter, a thermistor, or a varistor.

While the dielectric layers 10 and the internal electrode layers 12 are laminated in the Z-axis direction in the present embodiment, the lamination direction may be the X-axis direction or the Y-axis direction. In that case, the external electrodes 6 are formed according to the exposed surfaces of the internal electrode layers 12. The element body 4 is not necessarily a laminated body and may be a single layer. The internal electrode layers 12 may be drawn out to an outer surface of the element body 4 via through-hole electrodes. In that case, the through-hole electrodes and the external electrodes 6 are electrically connected.

In the present embodiment, the baked electrode layer 6a includes the oxides 63. However, the baked electrode layer 6a may not necessarily include the oxides 63.

EXAMPLES

Hereinafter, the present invention will be explained with more detailed examples. However, the present invention is not limited to the examples.

Experiment 1

<Sample No. 1>

A $(Ca_{0.7}Sr_{0.3})(Ti_{0.03}Zr_{0.97})O_3$ powder was prepared as a main raw material of a dielectric powder. Next, with respect to 100 parts by mol of the main raw material, 2.1 parts by mol of a $MnCO_3$ powder, 0.3 part by mol of an $Al_2O_3$ powder, and 1.6 parts by mol of a $SiO_2$ powder were weighed as subcomponents. The powders of the subcomponents were mixed in wet manner with a ball mill, dried, and calcined to give a subcomponent calcined powder.

Next, the main raw material of the dielectric powder: 100 parts by mass, the subcomponent calcined powder given above, an acrylic resin: 7 parts by mass, butyl benzyl phthalate (BBP) as a plasticizer: 4 parts by mass, and methyl ethyl ketone as a solvent: 80 parts by mass were mixed with a ball mill and turned into a paste to give a dielectric-layer paste.

In addition, nickel particles: 56 parts by mass, terpineol: 40 parts by mass, ethyl cellulose (molecular weight: 140,000): 4 parts by mass, and benzotriazole: 1 part by mass were kneaded with a triple-roll mill and turned into a paste to form an internal-electrode-layer paste.

Then, green sheets were formed on PET films using the dielectric-layer paste prepared above. The internal-electrode-layer paste was screen printed on the green sheets to give green sheets including internal electrode pattern layers.

The green sheets were laminated and bonded with pressure to give a green laminated body. The green laminated body was cut into a predetermined size to give green chips.

Next, the green chips were subjected to a binder removal treatment, firing, and annealing under the following conditions to give sintered bodies (element bodies 4).

As for the conditions of the binder removal treatment, the holding temperature was 260° C., and the atmosphere was air.

As for the firing conditions, the holding temperature was 1250° C., the ambient gas was a humidified mixed gas of nitrogen and oxygen, and the oxygen partial pressure was $10^{-9}$ MPa or less.

As for the annealing conditions, the holding temperature was 1050° C., and the ambient gas was a humidified nitrogen gas (oxygen partial pressure: $10^{-8}$ MPa or less).

To humidify the ambient gases used in firing and annealing, a wetter was used.

Next, a first region paste was applied onto outer surfaces (end surfaces 4a and part of side surfaces 4b) of the element bodies 4 by a dipping method and was dried. The element bodies 4 were then held at 800° C. for 0.2 hour to form first regions 6a1.

The first region paste included copper to be a conductor 61 after firing, and silicon oxide and zinc oxide to be oxides 63 after firing. A solvent included in the first region paste was terpineol.

The element bodies 4 having the first regions 6a1, media, and a polishing liquid were mixed in barrel polishing. The element bodies 4 after barrel polishing were washed with a cleaning solution and dried. In this manner, voids 62 formed on outer surfaces of the first regions 6a1 were sealed.

Next, a second region paste was applied onto the outer surfaces of the first regions 6a1 by a dipping method and was dried. The element bodies 4 were then held at 800° C. for 0.2 hour to form second regions 6a2.

Except that the second region paste included a resin powder, the second region paste was composed of the same components as the first region paste. The resin powder included in the second region paste was polyethylene. Also, the second region paste had a higher copper concentration than the first region paste.

After the second regions 6a2 were formed, baked electrode layers 6a were subjected to a short-time nickel plating treatment. Immediately after that, the element bodies 4 were washed with water to wash away excess plating solution. This formed films 64 on the inner wall surfaces of the voids 62 of the baked electrode layers 6a.

After the films 64 were formed, the element bodies 4 having the baked electrode layers 6a, chips, media, and a solvent were mixed by barrel polishing. The element bodies 4 after barrel polishing were washed with a cleaning solution and dried. In this manner, voids 62 formed on external surfaces 6ab of the baked electrode layers 6a were sealed.

On each baked electrode layer 6a, a nickel plating electrode layer 6b1 and a tin plating electrode layer 6b2 were formed. Accordingly, capacitor samples (multilayer ceramic capacitors 2) with external electrodes 6 were obtained.

Accordingly, capacitor samples 2 (multilayer ceramic capacitors 2) with external electrodes 6 were obtained.

The size of the element body 4 of each capacitor sample 2 was L0×W0×T0=3.2 mm×1.6 mm×1.6 mm. The number of dielectric layers 10 sandwiched between internal electrode layers 12 was 80.

The capacitor sample 2 was cut in parallel to the X-Z plane, and the cross section was subjected to Pt sputtering. Pt sputtering was performed at 20 mA, 20 sec, using JFC-1600 Auto fine coater manufactured by JEOL Ltd. The sputtered cross section was observed using a backscattered electron image and EDS. The backscattered electron image was observed at 15 kV with a tabletop microscope, Miniscope (registered trademark) TM3030, manufactured by Hitachi High-Tech Science Corporation. EDS observation was performed with BRUKER QUANTAX 70.

From the observation, it was confirmed that the main component of the baked electrode layers 6a was copper, that the oxides 63 were composed of zinc oxide and silicon oxide, and that the inner wall surfaces of the voids 62 were at least partly covered by the films 64. Further, in a field of view of 30 μm×30 μm in contact with the external surface Gab, four or more films 64 having a thickness of 0.5 μm or more and a length of 4 μm or more were observed. It was additionally confirmed that, among the voids 62 having an equivalent circular diameter of 3 μm or more in the field of view of 30 μm×30 μm in contact with the external surface 6ab, the number of the voids 62 completely filled with nickel was zero. The conductor 61, the voids 62, the oxides 63, and the films 64 were disposed as shown in FIGS. 2 to 4.

Also, the average thickness (Td) of the dielectric layers 10 sandwiched between the internal electrode layers 12, the average thickness (Te) of the internal electrode layers 12, the average thickness (Tc) of the films 64, the average thickness (Tt) of the external electrodes 6, and the average thickness (Ts) of the baked electrode layers 6a were measured. Measurement was performed at ten points each to calculate the respective averages. The results were as follows.

Average thickness (Td) of the dielectric layers 10 sandwiched between the internal electrode layers 12: 6.2 μm Average thickness (Te) of the internal electrode layers 12: 1.5 μm Average thickness (Tc) of the films 64: 1 μm Average thickness (Tt) of the external electrodes 6: 64 μm Average thickness (Ts) of the baked electrode layers 6a: 59 μm Using the following methods, the equivalent series resistance (ESR) of the capacitor samples 2 and the ESR thereof after a heating treatment were measured, and a 10-mm deflection test was performed.

ESR

The ESR of the capacitor samples 2 was measured at a frequency of 10 MHz.

Table 1 shows the results.

ESR after the Heating Treatment

The capacitor samples 2 were heated by being left in an environment at 200° C. for 24 hours. The ESR of the capacitor samples 2 after heating was measured with an impedance analyzer at a frequency of 10 MHz. Table 1 shows the results.

10-mm Deflection Test

Figure 5:
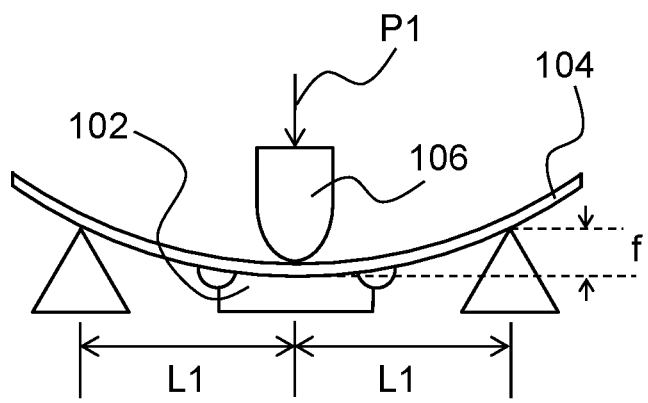
FIG. 5 is a diagram showing an example of the present invention.

The capacitance of ten capacitor samples was measured at 25° C., 1 kHz, and 1 Vrms with a digital LCR meter. Next, as shown in FIG. 5, each of the ten capacitor samples 102 (multilayer ceramic capacitors 2) was mounted on a glass epoxy substrate 104 having a thickness of 1.6 mm using solder (Sn 96.5%-Ag 3%-Cu 0.5%). Note that numeral L1 in FIG. 5 indicates a length of 45 mm. After that, using a deflection tester, deflection stress was applied to the glass epoxy substrate 104 with a pressuring jig 106 (R230) having a width of 20 mm from the direction indicated by arrow P1 until the amount of deflection (f) reached 10 mm.

The capacitance of the ten capacitor samples was measured at 25° C., 1 kHz, and 1 Vrms with the digital LCR meter, and the number of the capacitor samples that had a reduced capacitance or produced an abnormal noise was counted.

<Sample No. 2>

Capacitor samples of Sample No. 2 were manufactured as in Sample No. 1, except that the baked electrode layers 6a were not subjected to the short-time nickel plating treatment. The average thickness (Tc) of the films 64, the ESR, and the ESR after the heating treatment were measured, and the 10-mm deflection test was performed. Table 1 shows the results.

<Sample No. 3>

Capacitor samples of Sample No. 3 were manufactured as in Sample No. 2, except that the component included in the baked-electrode-layer pastes to be the main component of the baked electrode layers 6a after firing was changed from copper to nickel. The average thickness (Tc) of the films 64, the ESR, and the ESR after the heating treatment were measured, and the 10-mm deflection test was performed. Table 1 shows the results.

<Sample No. 4>

Capacitor samples of Sample No. 4 were manufactured as in Sample No. 1, except that the baked electrode layers 6a were not formed and resin electrode layers were formed instead as follows. The average thickness (Tc) of the films 64, the ESR, and the ESR after the heating treatment were measured, and the 10-mm deflection test was performed. Table 1 shows the results.

Specifically, a base-electrode-layer paste including copper was applied onto the sintered bodies (element bodies 4) manufactured as explained in Sample No. 1 and was baked at 800° C. Then, a conductive thermosetting resin composition was prepared by kneading an unhardened thermosetting resin component (epoxy resin), a silver powder, and an organic solvent. On the outer surfaces of base electrode layers, the conductive thermosetting resin composition was applied. Then, the element bodies 4 with the conductive thermosetting resin composition applied were held in an atmosphere at a temperature equivalent to or exceeding the hardening temperature of the conductive thermosetting resin composition to form the resin electrode layers on the element bodies 4.

On the resin electrode layers, a nickel plating electrode layer 6b1 and a tin plating electrode layer 6b2 were formed to give the capacitor samples (multilayer ceramic capacitors 2).

<Sample No. 5>

Capacitor samples of Sample No. 5 were manufactured as in Sample No. 1, except that the time for performing the short-time nickel plating treatment on the second regions 6a2 of the baked electrode layers 6a was increased. The average thickness (Tc) of the films 64, the ESR, and the ESR after the heating treatment were measured, and the 10-mm deflection test was performed. Table 1 shows the results. In Sample No. 5, the inside of all voids 62 having an equivalent circular diameter of 3 μm or more in a field of view of 30 μm×30 μm in contact with the external surface 6ab was completely filled with nickel.

TABLE 1

| Sample No. | External electrode | Average thickness (Tc) of films [μm] | ESR (10 MHz) [mΩ] | ESR after heating treatment (10 MHz) [mΩ] | 10-mm deflection test |
|---|---|---|---|---|---|
| 2 | Cu baked electrode layer | None | 4.72 | 5.02 | 0/10 |
| 3 | Ni baked electrode layer | None | 4.82 | 5.12 | 3/10 |

TABLE 1-continued

| Sample No. | External electrode | Average thickness (Tc) of films [μm] | ESR (10 MHz) [mΩ] | ESR after heating treatment (10 MHz) [mΩ] | 10-mm deflection test |
|---|---|---|---|---|---|
| 4 | Cu/resin electrode (Ag and resin) | None | 6.72 | 6.81 | 0/10 |
| 1 | Cu baked electrode layer | 1 μm | 4.66 | 4.68 | 0/10 |
| 5 | Cu baked electrode layer | Completely filled | 4.62 | 4.63 | 2/10 |

From Sample Nos. 1 and 2, it was confirmed that, the ESR was lower and the ESR after the heating treatment was further lower when the films 64 were included (Sample No. 1) than when the films 64 were not included (Sample No. 2). It is believed that, because the voids 62 included the films 64 in Sample No. 1, the baked electrode layers 6a including copper as a main component were difficult to be oxidized.

From Sample Nos. 1 and 3, it was confirmed that, the ESR was lower and the ESR after the heating treatment was further lower when the main component of the baked electrode layers 6a was copper and the films 64 were included (Sample No. 1) than when the main component of the baked electrode layers 6a was nickel and the films 64 were not included (Sample No. 3). It is believed that this was because nickel, which was the main component of the baked electrode layers 6a in Sample No. 3, formed a passivation film.

From Sample Nos. 1 and 3, it was confirmed that, the result of the 10-mm deflection test was better when the main component of the baked electrode layers 6a was copper and the films 64 were included (Sample No. 1) than when the main component of the baked electrode layers 6a was nickel and the films 64 were not included (Sample No. 3).

From Sample Nos. 1 and 4, it was confirmed that, the ESR was lower and the ESR after the heating treatment was further lower when the main component of the baked electrode layers 6a was copper and the films 64 were included in the baked electrode layers 6a (Sample No. 1) than when the baked electrode layers 6a were replaced by the resin electrode layers including silver (Sample No. 4).

From Sample Nos. 1 and 5, it was confirmed that, the result of the 10-mm deflection test was better when the average thickness (Tc) of the films 64 was 1 μm (Sample No. 1) than when the voids 62 of the baked electrode layers 6a were completely filled with the films 64 (Sample No. 5). It is believed that this was because inclusion of the voids in the baked electrode layers 6a prevented defects caused by deflection in Sample No. 1.

Experiment 2

<Sample No. 11>

Measurement of the ESR and the 10-mm deflection test were performed as in Sample No. 1, except that the first regions 6a1 were formed in the following manner, [(the second ratio of Ni/Cu)−(the first ratio of Ni/Cu)] was measured, and a 15-mm deflection test was performed in the following manner. Table 2 shows the results.

In Sample No. 11, element bodies 4 were manufactured as in Sample No. 1. Next, a first region paste including a resin powder was applied onto outer surfaces (end surfaces 4a and part of side surfaces 4b) of the element bodies 4 by a dipping method and was dried. The element bodies 4 were then held at 800° C. for 0.2 hour to form the first regions 6a1.

The first regions 6a2 were subjected to the short-time nickel plating treatment. Immediately after that, the element bodies 4 were washed with water to wash away excess plating solution. This formed the films 64 on the surfaces of the voids 62 of the first regions 6a2.

After the films 64 were formed, the element bodies 4 having the first regions 6a1, chips, media, and a polishing liquid were mixed by barrel polishing. The element bodies 4 after barrel polishing were washed with a cleaning solution and dried. The voids 62 formed on the outer surfaces of the first regions 6a1 were sealed. After that, the second regions 6a2 were formed as in Sample No. 1 to give capacitor samples 2.

15-mm Deflection Test

The capacitance of ten capacitor samples was measured at 25° C., 1 kHz, and 1 Vrms with a digital LCR meter. Next, as shown in FIG. 5, each of the ten capacitor samples 102 (multilayer ceramic capacitors 2) was mounted on a glass epoxy substrate 104 having a thickness of 1.6 mm using solder (tin 96.5%-silver 3%-copper 0.5%). Note that numeral L1 in FIG. 5 indicates a length of 45 mm. After that, using a deflection tester, deflection stress was applied to the glass epoxy substrate 104 with a pressuring jig 106 (R230) having a width of 20 mm from the direction indicated by arrow P1 until the amount of deflection (f) reached 15 mm.

The capacitance of the ten capacitor samples was measured at 25° C., 1 kHz, and 1 Vrms with the digital LCR meter, and the number of the capacitor samples that had a reduced capacitance or produced an abnormal noise was counted.

<Sample Nos. 12 and 13>

Measurement of the ESR and the 10-mm deflection test were performed as in Sample No. 1, and the 15-mm deflection test using the above-mentioned method was performed, except that [(the second ratio of Ni/Cu)–(the first ratio of Ni/Cu)] was changed for measurement by changing the amount of time of the short-time nickel plating treatment. Table 2 shows the results.

TABLE 2

| Sample No. | [(Second ratio of Ni/Cu)–(first ratio of Ni/Cu)] | ESR (10 MHz) [mΩ] | 10-mm deflection test | 15-mm deflection test |
|---|---|---|---|---|
| 11 | −0.001 | 4.66 | 0/10 | 1/10 |
| 12 | 0.023 | 4.65 | 0/10 | 0/10 |
| 13 | 0.073 | 4.64 | 0/10 | 0/10 |

From Table 2, it was confirmed that, the result of the 15-mm deflection test was better when the value of [(the second ratio of Ni/Cu)–(the first ratio of Ni/Cu)] was 0.02 or more (Sample Nos. 12 and 13) than when the value of [(the second ratio of Ni/Cu)–(the first ratio of Ni/Cu)] was −0.001 (Sample No. 11).

Experiment 3

<Sample Nos. 21 to 25>

Measurement of the ESR and the 10-mm deflection test were performed as in Sample No. 1, and the 15-mm deflection test was performed, except that the conductor area ratio and the void area ratio were changed by changing the amount of the resin powder included in the second region paste to measure the average conductor area ratio and the average void area ratio as explained in the above-mentioned embodiment. Table 3 shows the results.

TABLE 3

| Sample No. | Average conductor area ratio | Average void area ratio | ESR (10 MHz) [mΩ] | 10-mm deflection test | 15-mm deflection test |
|---|---|---|---|---|---|
| 21 | 0.52 | 0.26 | 4.83 | 0/10 | 0/10 |
| 22 | 0.56 | 0.24 | 4.62 | 0/10 | 0/10 |
| 23 | 0.62 | 0.19 | 4.64 | 0/10 | 0/10 |
| 24 | 0.74 | 0.12 | 4.66 | 0/10 | 0/10 |
| 25 | 0.81 | 0.09 | 4.63 | 0/10 | 2/10 |

From Table 3, it was confirmed that the ESR was lower when the average conductor area ratio was 0.55 to 0.75 and the average void area ratio was 0.1 to 0.25 (Sample Nos. 22 to 24) than when the average conductor area ratio was 0.52 and the average void area ratio was 0.26 (Sample No. 21).

From Table 3, it was confirmed that the result of the 15-mm deflection test was better when the average conductor area ratio was 0.55 to 0.75 and the average void area ratio was 0.1 to 0.25 (Sample Nos. 22 to 24) than when the average conductor area ratio was 0.81 and the average void area ratio was 0.09 (Sample No. 25).

<Sample Nos. 31 to 35>

In Sample Nos. 31 to 35, measurement of the ESR after the heating treatment and the 10-mm deflection test were performed as in Sample No. 1, and the 15-mm deflection test using the above-mentioned method was performed, except that the whole ratio of Ni/Cu and the average thickness (Tc) of the films were changed for measurement by changing the amount of time of the short-time nickel plating treatment. Table 4 shows the results.

TABLE 4

| Sample No. | Whole ratio of Ni/Cu | Average thickness (Tc) of films [μm] | ESR after heating treatment (10 MHz) [mΩ] | 10-mm deflection test | 15-mm deflection test |
|---|---|---|---|---|---|
| 31 | 0.069 | 0.48 | 4.86 | 0/10 | 0/10 |
| 32 | 0.082 | 0.58 | 4.77 | 0/10 | 0/10 |
| 33 | 0.110 | 1.1 | 4.67 | 0/10 | 0/10 |
| 34 | 0.191 | 2.9 | 4.62 | 0/10 | 0/10 |
| 35 | 0.211 | 3.4 | 4.64 | 0/10 | 1/10 |

From Table 4, it was confirmed that, the ESR after the heating treatment was lower when the whole ratio of Ni/Cu was 0.08 to 0.2 and the average thickness (Tc) of the films was 0.5 to 3 (Sample Nos. 32 to 34) than when the whole ratio of Ni/Cu was 0.069 and the average thickness (Tc) of the films was 0.48 (Sample No. 31).

From Table 4, it was confirmed that, the result of the 15-mm deflection test was better when the whole ratio of Ni/Cu was 0.08 to 0.2 and the average thickness (Tc) of the films was 0.5 to 3 (Sample Nos. 32 to 34) than when the whole ratio of Ni/Cu was 0.211 and the average thickness (Tc) of the films was 3.4 (Sample No. 35).

NUMERICAL REFERENCES 2, 102 . . . multilayer ceramic capacitor (capacitor sample)
4 . . . element body
4a . . . end surface
4b . . . side surface
10 . . . dielectric layer (ceramic layer)
12 . . . internal electrode layer
6 . . . external electrode
6a . . . baked electrode layer 6a1 . . . first region
6a2 . . . second region
61 . . . conductor
62 . . . void
63 . . . oxide
64 . . . film
6ab . . . external surface (boundary between baked electrode layer and plating electrode layer)
6b . . . plating electrode layer
6b1 . . . Ni plating electrode layer
6b2 . . . Sn plating electrode layer
46 . . . joint boundary
104 . . . glass epoxy substrate
106 . . . pressuring jig

What is claimed is:

1. A ceramic electronic device comprising:
an element body including a ceramic layer and an internal electrode layer; and
an external electrode formed on an end surface of the element body and electrically connected to at least one end of the internal electrode layer, wherein
the external electrode includes a baked electrode layer,
the baked electrode layer includes a main component comprising copper and/or a copper alloy,
the baked electrode layer includes a void,
an inner wall surface defining the void is at least partly covered by a film comprising nickel and/or a nickel alloy,
the baked electrode layer comprises a first region and a second region,
the first region is in contact with the end surface of the element body and is located near a joint boundary between the baked electrode layer and the element body,
the second region is located at an outer side of the first region and constitutes an external surface of the baked electrode layer, and
a value of [(a second ratio of Ni/Cu)−(a first ratio of Ni/Cu)] is 0.02 or more based on the premise that the first ratio of Ni/Cu denotes an atomic ratio of nickel atoms to copper atoms in the first region and the second ratio of Ni/Cu denotes an atomic ratio of nickel atoms to copper atoms in the second region.

2. The ceramic electronic device according to claim 1, wherein
a conductor area ratio denotes a ratio of a total cross-sectional area of a conductor in a unit cross-sectional area of the baked electrode layer to the unit cross-sectional area of the baked electrode layer, and
the conductor area ratio is 0.55 to 0.75.

3. The ceramic electronic device according to claim 1, wherein
a void area ratio denotes a ratio of a total cross-sectional area of the void in a unit cross-sectional area of the baked electrode layer to the unit cross-sectional area of the baked electrode layer, and
the void area ratio is 0.1 to 0.25.

4. The ceramic electronic device according to claim 1, wherein
a whole ratio of Ni/Cu denotes an atomic ratio of nickel atoms to copper atoms in the baked electrode layer as a whole, and
the whole ratio of Ni/Cu is 0.08 to 0.2.

5. The ceramic electronic device according to claim 1, wherein
the baked electrode layer comprises an oxide including silicon and/or zinc.

6. A ceramic electronic device comprising:
an element body including a ceramic layer and an internal electrode layer; and
an external electrode formed on an end surface of the element body and electrically connected to at least one end of the internal electrode layer, wherein
the external electrode includes a baked electrode layer,
the baked electrode layer includes a main component comprising copper and/or a copper alloy,
the baked electrode layer includes a void,
an inner wall surface defining the void is at least partly covered by a film comprising nickel and/or a nickel alloy,
a whole ratio of Ni/Cu denotes an atomic ratio of nickel atoms to copper atoms in the baked electrode layer as a whole, and
the whole ratio of Ni/Cu is 0.08 to 0.2.

7. The ceramic electronic device according to claim 6, wherein
the baked electrode layer comprises a first region and a second region,
the first region is in contact with the end surface of the element body and is located near a joint boundary between the baked electrode layer and the element body,
the second region is located at an outer side of the first region and constitutes an external surface of the baked electrode layer, and
a value of [(a second ratio of Ni/Cu)−(a first ratio of Ni/Cu)] is 0.02 or more based on the premise that the first ratio of Ni/Cu denotes an atomic ratio of nickel atoms to copper atoms in the first region and the second ratio of Ni/Cu denotes an atomic ratio of nickel atoms to copper atoms in the second region.

8. The ceramic electronic device according to claim 6, wherein
a conductor area ratio denotes a ratio of a total cross-sectional area of a conductor in a unit cross-sectional area of the baked electrode layer to the unit cross-sectional area of the baked electrode layer, and
the conductor area ratio is 0.55 to 0.75.

9. The ceramic electronic device according to claim 6, wherein
a void area ratio denotes a ratio of a total cross-sectional area of the void in a unit cross-sectional area of the baked electrode layer to the unit cross-sectional area of the baked electrode layer, and
the void area ratio is 0.1 to 0.25.

10. The ceramic electronic device according to claim 6, wherein
the baked electrode layer comprises an oxide including silicon and/or zinc.

* * * * *